United States Patent [19]

O'Donnell

[11] Patent Number: 5,889,120
[45] Date of Patent: Mar. 30, 1999

[54] BLENDS OF AND METHODS OF BLENDING OLEFIN/ESTER COPOLYMERS HAVING IMPROVED ENVIRONMENTAL STRESS CRACKING OR ENVIRONMENTAL FATIGUE RESISTANCE

[75] Inventor: Hugh J. O'Donnell, Cincinnati, Ohio

[73] Assignee: The Proctor & Gamble Company, Cincinnati, Ohio

[21] Appl. No.: 627,485

[22] Filed: Jun. 24, 1996

[51] Int. Cl.⁶ .............................. C08L 23/08; C08L 33/06
[52] U.S. Cl. ............................................. 525/240; 525/222
[58] Field of Search ..................................... 525/240, 222

[56] References Cited

U.S. PATENT DOCUMENTS

| | | | |
|---|---|---|---|
| 2,200,429 | 5/1940 | Perrin et al. ............................... | 260/80 |
| 3,261,889 | 7/1966 | van 't Wout .............................. | 260/897 |
| 3,382,298 | 5/1968 | Larson et al. ............................. | 260/897 |
| 3,410,928 | 11/1968 | Baum ....................................... | 260/897 |
| 3,485,783 | 12/1969 | Kehe ........................................ | 260/27 |
| 3,533,976 | 10/1970 | Eldman .................................... | 260/28.5 |
| 3,663,663 | 5/1972 | McAda ................................. | 260/897 B |
| 3,770,852 | 11/1973 | Hager et al. ......................... | 260/897 B |
| 3,808,047 | 4/1974 | McAda ..................................... | 117/232 |
| 3,988,509 | 10/1976 | Cooper et al. ........................... | 528/491 |
| 4,247,584 | 1/1981 | Widiger et al. ............................ | 428/35 |
| 4,312,918 | 1/1982 | Bostwick ................................. | 428/379 |
| 4,680,340 | 7/1987 | Oreglia et al. ............................ | 525/72 |
| 4,853,265 | 8/1989 | Warren ................................... | 428/34.9 |
| 5,223,566 | 6/1993 | Aida et al. .............................. | 524/451 |
| 5,403,892 | 4/1995 | Puydak et al. .......................... | 525/192 |
| 5,439,178 | 8/1995 | Peterson ................................. | 239/333 |
| 5,503,552 | 4/1996 | Diesso ...................................... | 433/37 |

*Primary Examiner*—Fred Zitomer
*Attorney, Agent, or Firm*—J. Mark Gilbreth; Robert W. Strozier; Gilbreth & Strozier, P.C.

[57] ABSTRACT

A blend and flexible product made of two copolymers of an olefin and an ethylenically unsaturated carboxylic ester monomer. The copolymers are selected such that each copolymer includes greater than 6 weight percent ethylenically unsaturated carboxylic ester monomer, or selected to be more than 10 weight percent of the blend. If the copolyers have similar ester contents, that is differing by less than 6 weight percent, the copolymers are selected such that their difference in their melt flows is greater than about 8. If the copolymers have dissimilar ester contents, that is differing by more than 6 weight percent, the copolymers are selected such that the ratio of their melt flows is about 2 or less.

17 Claims, 1 Drawing Sheet

BLENDS OF AND METHODS OF BLENDING OLEFIN/ESTER COPOLYMERS HAVING IMPROVED ENVIRONMENTAL STRESS CRACKING OR ENVIRONMENTAL FATIGUE RESISTANCE

BACKGROUND OF THE INVENTION

1. Field of the Invention

The present invention relates to polymer blends, to methods of making such blends, to products made from such blends, and to methods of molding. In another aspect, the present invention relates to polymer blends having improved environmental stress cracking or environmental fatigue resistance, to methods of making such blends, to products made from such blends, and to methods of molding such products. In even another aspect, the present invention relates to blends of copolymers of olefins/and ethylenically unsaturated carboxylic ester monomers, to methods of making such blends, to products made therefrom, and to methods of molding such products. In still another aspect, the present invention relates to blends of copolymers of olefins/and ethylenically unsaturated carboxylic ester monomers having improved environmental stress cracking or environmental fatigue resistance, to methods of making such blends, to products made therefrom, and to methods of molding such products.

2. Description of the Related Art

Many applications require a material which exhibits a resistance to stress cracking and fatigue failure during exposure to an aggressive chemical environment. Stress cracking or environmental stress cracking (ESC) is the brittle failure of plastic parts when simultaneously subjected to mechanical stress and chemical exposure. In a similar fashion, environmental fatigue (EF) is the failure or cracking or a part when simultaneously subjected to dynamic mechanical stress and chemical exposure. Insufficient environmental stress cracking or environmental fatigue resistance leads to greatly shortened service life of a part.

Ethylene/vinyl acetate copolymers are commonly injection molded into products utilized in applications requiring good environmental stress cracking or environmental fatigue resistance.

One common way of obtaining an ethylene/vinyl acetate copolymer with good environmental stress cracking or environmental fatigue resistance is to select a high molecular weight viscous resin especially a resin with a narrow molecular weight distribution. Unfortunately, some processes cannot utilize such a viscous resin. For example, in a process such as injection molding, small intricate, mold passages can pose a problem for such a viscous resin. Consequently, this approach of utilizing a high molecular viscous resin is not useful when fabricating a part by injection molding.

There are numerous patents disclosing polymers having improved environmental stress crack resistance.

U.S. Pat. No. 3,261,889, issued Jul. 19, 1966 to van't Wout, discloses a polyethylene-containing material having an increased resistance to environmental stress cracking. The increased resistance is provided by the addition of an atactic copolymer of ethylene with propylene and/or butene-1, and/or by the addition of an atactic copolymer of ethylene with propylene and 1–10% by weight of a diene containing 5–20 carbon atoms.

U.S. Pat. No. 3,382,298, issued May 7, 1968 to Larsen et al., discloses a blend of low density polyethylene and either a polyvinyl ester or polyvinyl acetal. The polyethylenes utilized have a melt index from about 0.01 to about 50 decigrams/minute, and the polyvinyl esters utilized have molecular weight from about 7,000 to 140,000.

U.S. Pat. No. 3,410,928, issued Nov. 12, 1968 to Baum, discloses blends of olefin high polymers and ethylene/acrylic acid copolymers which exhibit greatly improved adhesivity, printability, grease resistance, and stress crack resistance compared with olefin polymers alone. The olefin polymers have a molecular weight of at least 10,000 or a melt index of about 100 or less.

U.S. Pat. No. 3,485,783, issued Dec. 23, 1969, to Kehe, discloses a hot melt adhesive composition that is a blend of an ethylene/alkyl acrylate copolymer, an ethylene/acrylic acid copolymer, and a polymerized rosin ester.

U.S. Pat. No. 3,533,976, issued Oct. 13, 1970, to Eldman, discloses polyolefin blends with superior stress crack resistance comprising polyethylene resin, an ethylene vinyl acetate copolymer, a synthetic paraffin wax, carbon black and an antioxidant. The blend comprises 76 to 92 weight percent polyethylene, and 7 to 15 weight percent ethylene vinyl acetate.

U.S. Pat. No. 3,663,663, issued May 16, 1972 to Bernie et al., discloses polyolefin-ethylene/ester copolymer blend compositions having improved stress cracking properties, especially in the presence of stress crack promoting detergents. The blends comprise a high molecular weight polyethylene having a melt index in the range of about 0.01 to about 10.0, and a copolymer of ethylene and an ester comonomer having a molecular weight below 15,000.

U.S. Pat. No. 3,770,852, issued Nov. 6, 1973 to Hager et al., discloses polyolefin blends having broad polymodal molecular weight distribution and improved environmental stress crack resistance, which are prepared by polymerizing an olefin or a mixture of ethylene and vinyl acetate in a first reaction region, passing the resulting reaction product to a second reaction region into which a second olefin gas stream is fed and polymerized and blending the polymerization product from the second reaction region with a single reactor ethylene-vinyl acetate copolymer. The dual reactor copolymers have a vinyl acetate content up to about 6 percent. The single reactor copolymer contains from 0 to about 70 weight percent vinyl acetate, and has a melt index from about 1 to 5,000. The '852 patent teaches that there is no advantage in the blend having more than ten percent of the single reactor ethylene-vinyl acetate copolymer.

U.S. Pat. No. 3,808,047, issued Apr. 30, 1974 to McAda, discloses a polyethylene blend having improved stress cracking resistance comprising a high molecular weight polyethylene having a melt index from 0.01 to 10 decigrams/minute, and a copolymer of ethylene and an ester comonomer, with the copolymer having a molecular weight below 15,000 and from 20 to 65 weight percent ester comonomer moiety. The blend comprises 85 to 95 weight percent of the high molecular weight percent polyethylene, and from 5 to 15 weight percent of the low molecular weight copolymer. The method for preparing the blend includes introducing the copolymer into the polyethylene in the molten state as it passes from the polymerization zone.

U.S. Pat. No. 4,312,918, issued Jan. 26, 1982 to Bostwick, discloses compositions of polyethylene and a copolymer of ethylene-alkyl acrylate having improved environmental stress cracking resistance.

However, in spite of these advancements in the prior art, there is still a need for an ethylene/vinyl acetate copolymer having improved stress cracking resistance.

There is another need in the art for a method of improving the stress cracking resistance of an ethylene/vinyl acetate copolymer.

These and other needs in the art will become apparent to those of skill in the art upon review of this specification, including its drawings and claims.

SUMMARY OF THE INVENTION

It is an object of the present invention to provide for blends of ethylene/vinyl acetate copolymers having improved stress cracking resistance.

It is another object of the present invention to provide for methods of blending ethylene/vinyl acetate copolymers having improved stress cracking resistance.

These and other objects of the present invention will become apparent to those of skill in the art upon review of this specification, including its drawings and claims.

According to one embodiment of the present invention, there is provided a composition comprising a blend composition of a first copolymer and a second copolymer. The copolymers are copolymers of an olefin and an ethylenically unsaturated carboxylic ester monomer, with each having greater than 6 weight percent ester monomer content. In an alternative embodiment, the arithmetic difference between the copolymer monomer contents are less than about 6 weight percent, and the arithmetic difference between the copolymer melt flow indexes is greater than about 8. In a second alternative embodiment, the arithmetic difference between the copolymer ester monomer contents is at least 6 weight percent, and the ratio of the melt flow index of the copolymer having a higher ester monomer content to the melt flow index of the other copolymer, is about 2 or less.

According to another embodiment of the present invention there is provided a blend composition of a first copolymer and a second copolymer. The copolymers are copolymers of an olefin and an ethylenically unsaturated carboxylic ester monomer with each copolymer comprising greater than about 10 weight percent of the blend. In an alternative embodiment, the arithmetic difference between the copolymer ester monomer contents are less than about 6 weight percent, and the arithmetic difference between the copolymer melt flow indexes is greater than about 8. In a second alternative embodiment, the arithmetic difference between the copolymer ester monomer contents is at least 6 weight percent, and the ratio of the melt flow index of the copolymer having a higher ester monomer content to the melt flow index of the other copolymer, is about 2 or less.

According to another embodiment of the present invention, there is provided a method of making a polymer blend. The method generally includes contacting together, the first and second copolymers as described above. Mixing may be accomplished utilizing any suitable device, for example, Banbury mixers, steam heated two roll mill mixers, screw type extruders, and the like, or may be accomplished utilizing multiple reactors.

According to another embodiment of the present invention there is provided a product having a body with a flexible, spring-like portion. The body comprises a blend of the first and second copolymer as described above.

According to another embodiment of the present invention there is provided a method of forming a product. The method includes forming a softened or molten blend of first and second copolymers as described above, forming the blend into a desired shape, cooling the formed shape to stabilize the product.

DETAILED DESCRIPTION OF THE INVENTION

Figure 2:
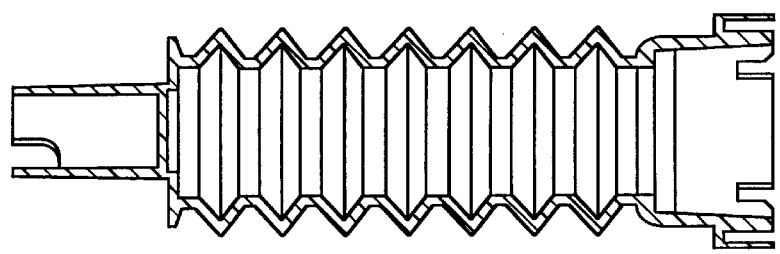
FIG. 2 is a side view of lotion pump bellows 30 of Example 2.

The blends of the present invention generally include a first copolymer of an $\alpha$-olefin and an ethylenically unsaturated carboxylic ester monomer, having a first melt flow index and a first weight percent ester monomer content.

The first copolymer is selected to provide the blend with suitable resistance to cracking, while not deterring its use for molding. Therefore, the first copolymer must have a molecular weight low enough to provide suitable flowability for the type of mold utilized. For example, the molding of fine or thin walled parts requires lower molecular weight than the molding of other parts. However, the molecular weight of the first copolymer must also be high enough to provide the resistance to cracking that is desired. Generally, the first copolymer utilized in the present invention will generally have a melt flow index in the range of about 0.5 to about 35. Preferably, the first copolymer utilized in the present invention will have a melt flow index in the range of about 1 to about 20, more preferably in the range of about 1.2 to about 15, and most preferably in the range of about 1.5 to about 10.

The first copolymer utilized in the present invention will generally have an ester monomer content greater than 6 weight percent, preferably in the range of about 8 to about 40 weight percent. More preferably, the first copolymer utilized in the present invention will have weight percent ester monomer content in the range of about 10 to about 40 weight percent, and even more preferably in the range of about 12 to about 40 weight percent. Still more preferably, the first copolymer utilized in the present invention will have weight percent ester monomer content in the range of about 20 to about 35 weight percent and yet more preferably in the range of about 25 to about 28 weight percent.

The blends of the present invention further generally include a second copolymer of an olefin and an ethylenically unsaturated carboxylic ester monomer having a second melt flow index and a second weight percent ester monomer content. While preferred, it is not necessary that the first and second copolymers comprise identical monomers.

The second copolymer utilized in the present invention is selected to provide flowability to the blend. Usually, the first copolymer selected to provide crack resistance, and the second copolymer is selected to provide flowability. Thus, the second copolymer will generally have a molecular weight less than the first copolymer. The second copolymer will generally have a melt flow index in the range of about 3 to about 50. Preferably, the second copolymer utilized in the present invention will have a melt flow index in the range of about 5 to about 40, and most preferably in the range of about 7 to about 35 weight percent.

The second copolymer utilized in the present invention will generally have an ester monomer content greater than about 6 weight percent, preferably in the range of about 8 to about 22 weight percent. More preferably, the second copolymer utilized in the present invention will have weight percent ester monomer content in the range of about 10 to about 22 weight percent and even more preferably in the range of about 12 to about 22 weight percent. Even more preferably, the first copolymer utilized in the present invention will have weight percent ester monomer content in the range of about 15 to about 22 weight percent and still more preferably in the range of about 15 to about 19 weight percent.

In the practice of the present invention, the first and second copolymers are generally selected to provide a blend having a desired environmental stress crack resistance and environmental fatigue. As these properties will vary depending upon the particular chemical environment, the selection of the copolymers must be tailored to each environment.

In general, the copolymers can be selected by one of two general embodiments, depending upon whether the comonomer contents of the two copolymers are similar or dissimilar.

For the purposes of this invention, copolymers are considered similar if the arithmetic difference (i.e., upon subtraction) in their weight percent ester comonomer contents is generally less than about 6 weight percent, preferably less than about 4 weight percent, and most preferably less than about 3 weight percent. For such similar copolymers, this embodiment provides that copolymers are chosen such that their melt flow indexes are different. Preferably, the arithmetic difference between the melt flow indexes of the two copolymers is greater than about 8, more preferably greater than about 15, and most preferably greater than about 20.

The second embodiment consists of choosing two copolymers such that the arithmetic difference between their weight percent comonomer contents is at least 6 weight percent, more preferably at least 8 weight percent, and most preferably at least 9 weight percent. Preferably, the copolymers utilized with this method comprise in the range of about 5 to about 40 weight percent ester monomer, more preferably in the range of about 9 to about 35 weight percent ester monomer, and most preferably in the range of about 15 to about 28 weight percent monomer. The resins are chosen so that the ratio of the melt flow index of the copolymer with the higher ester monomer content to the melt flow index of the copolymer with the low ester monomer content is about 2 or less, more preferably about 1.5 or less, and most preferably less than about 1.

The α-olefin utilized in the copolymers of the present invention generally comprises at least 2 carbon atoms. Preferably, the α-olefin utilized in the copolymers of the present invention comprise from about 2 to about 8 carbon atoms, more preferably from about 2 to about 4 carbon atoms, and most preferably from about 2 to about 3 carbon atoms. Preferable examples of suitable α-olefins includes ethylene, propylene and butylene. Most preferably, the α-olefin utilized in the present invention is ethylene.

The ethylenically unsaturated carboxylic ester monomers utilized in the copolymers of the present invention are selected from the group of vinyl esters of saturated carboxylic acids and alkyl esters of an α,β-ethylenically unsaturated carboxylic acids. Examples of suitable ester monomers include methyl acrylate, ethyl acrylate, butyl acrylate, isobutyl acrylate, methyl methacrylate, diethyl maleate, dimethyl fumarate, vinyl acetate, vinyl propionate and the like. Preferably the copolymer contains one of the following ester monomers: methyl acrylate, ethyl acrylate and vinyl acetate. Most preferably, the copolymer ethylene vinyl acetate.

The blends of the present invention can include any suitable amount of first and second copolymer which provide the desired properties. Generally, in the blends of the present invention the first and second copolymers will each comprise greater than about 10 weight percent of the blend. Preferably, in the blends of the present invention the first and second copolymer will each comprise in the range of greater than about 10 to less than about 90 weight percent of the blend. More preferably, the first and second copolymers will each comprise in the range of about 12 to about 88 weight percent of the blend, and even more preferably in the range of about 15 to about 85 weight percent of the blend. Still more preferably the first and second copolymers will each comprise in the range of about 20 to about 80 weight percent of the blend, and yet more preferably in the range of about 30 to 70 weight percent of the blend.

The blends of the present invention can be obtained utilizing any suitable blending method and apparatus. Examples of suitable apparatus include Banbury mixers, steam heated two roll mill mixers, screw type extruders, and the like. Any conventional method which provides a homogeneous mixture can be employed. For example, the selected polymers can be fluxed along with any desired additives in a Banbury mixer for a four or five minute cycle, with the material then worked on a two-roll mill before transferring it into the rolls of a calender mill. It is also possible to have the mixing accomplished in a mixing extruder prior to forming the composition. The blends can also be formed in one or more reactors in situ.

The blends of the present invention will find utility in the making of products subject to static or cyclic loading conditions in a harsh chemical environment, for example, bellows, diaphrams, and boots. Such products have a flexible, resilient, spring-like portion, which can be subject to static or cyclic loading. Such a spring-like portion may comprise one or more folds, pleats or the like, to form an accordion-shaped section which functions as a spring, for example as with a bellows.

Products can be made from blends of the present invention utilizing any suitable method. For example, blends of the present invention find use in a broad range of polymer fabrication processes, including, injection molding, stamp molding, extrusion, pultrusion, pressing, blow molding, and the like. Generally, blends of the present invention are heated above the melting point and formed into a desired shape, and cooled to stabilize the blend into the desired shape.

Methods of copolymerizing an olefin and an ethylenically unsaturated carboxylic ester monomer are well known, and any suitable method may be utilized. The typical method utilizes a high pressure free radical reaction where ethylene and liquid comonomer are admixed in the presence of catalyst to create copolymer. Such reaction may be conducted in a stirred tank reactor as described in U.S. Pat. No. 2,220,429, or conducted in a continuous tubular reactor as described in U.S. Pat. No. 3,988,509, both herein incorporated by reference.

In the practice of the present invention, there may be utilized, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The blends of the present invention may be further blended with or incorporated into one or more thermoplastics. The first and second copolymers can first be blended, and then subsequently blended with the one or more thermoplastics, or the one or more thermoplastics can be included during the blending of the first and second copolymers. Suitable thermoplastics include polyolefins, especially polyethylenes and polypropylenes, polyesters, polyacrylamides, polyamides, polycarbonates, polyurethanes, polyacrylonitriles, and butadiene styrenes. Preferred polyethylenes include linear low density polyethylenes.

EXAMPLES

The following examples are provided to illustrate the invention and are not to limit the scope of the claims of the invention.

Example 1

Blends of commercially available resins were prepared in a two step process. In the first step, desired portions of resins were dry blended to obtain a dispersion of the selected pelletized resins. Dry blending was performed in a Kelly Duplex mixer sold by Duplex Mill & Manufacturing Company, Springfield Ohio 45501. The resin was blended for 10 to 20 minutes. In the second step, the dry blended resins were feed to the hopper of an extruder for melt blending. The extrusion was performed in a 30 mm Werner Pfleiderer ZSK-30 corotating twin screw extruder, made in Austria, configured with one kneading section. The temperatures in the feeding zone were approximately 130° C., and the temperatures in the plasticating and mixing zones of the barrel were approximately 170° C. The melt temperature measured at the die was about 175° C. The screw speed was about 250 rpm, and the throughput was between 20 and 50 pounds per hour. The end of the extruder was fitted with a two hole die plate which created dual strands of molten plastic. These strands were quenched in 50° to 70° F. water, pelletized and collected for further processing.

A number of blends were made using the process. Some of the blends are listed in Table 1. Ethylene vinyl acetate resins used in the blends were either Ultrathene (UE) obtained from Quantum Chemical Co., Cincinnati Ohio or Elvax (EL) obtained from E.I. DuPont, Wilmington Del. Blends made from resins with a range of vinyl acetate contents between 9 and 28 percent and MFI between 1.8 and 43 were evaluated. The estimated VA, MFI, and MFI ratio are listed in the last three columns of Table 1.

TABLE 2-A

Commercial Resins Molded Into Bellows

| Material | Resin | VA (%) | MFI (g/10 min) |
|---|---|---|---|
| A | UE630-000 | 17 | 1.8 |
| B | EL450 | 18 | 8 |
| C | UE652-059 | 19 | 30 |
| D | UE634-000 | 28 | 3 |
| E | EL250 | 28 | 25 |
| F | EL260 | 28 | 6 |

Method A: The bellows 60 illustrated in FIG. 1 (sprayer bellows) was made in a hand-mold. The hand-mold lacks temperature control or cooling circuits. Because of manual handling, the cooling time of the part and residence time in the injection molder were variable. The injection molder used for manufacture of this style bellow was an Arburg Allrounder 220-75-250, made in Germany. The melt temperature measured in these runs was between 195° and 225° C. An injection time between 0.2 and 0.6 seconds was used to fill the part. A pressure of about 12,000 psi was used to pack the part and this pressure was held for about 2 seconds. Bellows were removed from the core side of the mold by inflating the bellows with an air pressure of about 25 psi while simultaneously pulling the bellow off the core.

Method B.: The bellows 30 illustrated in FIG. 2 (lotion pump bellows) were made in an automatic unit cavity mold. The injection molding machine was a Engel 200 ton tiebarless machine, model EC88, made in Canada. The range of conditions used for manufacture of these bellows are specified in Table 2-B. These conditions are similar to the conditions used to manufacture the bellows described in Method A. The advantage of producing a bellow in the automatic mold with the Engel injection molding machine is that more uniform and reproducible operation, in particular control of time, pressure, and temperature, is obtained.

TABLE 1

Prepared Blends of EVA Resins

| Blend | Resin A | VA (%) | MFI (g/10 min) | Resin B | VA (%) | MFI (g/10 min) | Ratio A:B (wt. %) | VA (est. %) | MFI (est.) | MFI Ratio |
|---|---|---|---|---|---|---|---|---|---|---|
| 1 | UE634-000 | 28 | 3 | UE652-059 | 19 | 30 | 5:95 | 19 | 27 | 0.1 |
| 2 | EL240 | 28 | 43 | UETR209 | 15 | 23 | 35:65 | 20 | 29 | 1.9 |
| 3 | UE652-059 | 19 | 30 | UE630-000 | 17 | 1.8 | 50:50 | 18 | 8 | 16 |
| 4 | EL250 | 28 | 25 | EL760 | 9 | 2 | 50:50 | 19 | 7 | 12 |
| 5 | UE634-000 | 28 | 3 | UE652-059 | 19 | 30 | 40:60 | 23 | 12 | 0.1 |
| 6 | EL250 | 28 | 25 | UE635-000 | 9 | 10 | 85:15 | 25 | 22 | 2.5 |
| 7 | EL260 | 28 | 6 | UE635-000 | 9 | 10 | 85:15 | 25 | 7 | 0.6 |

Example 2

Figure 1:
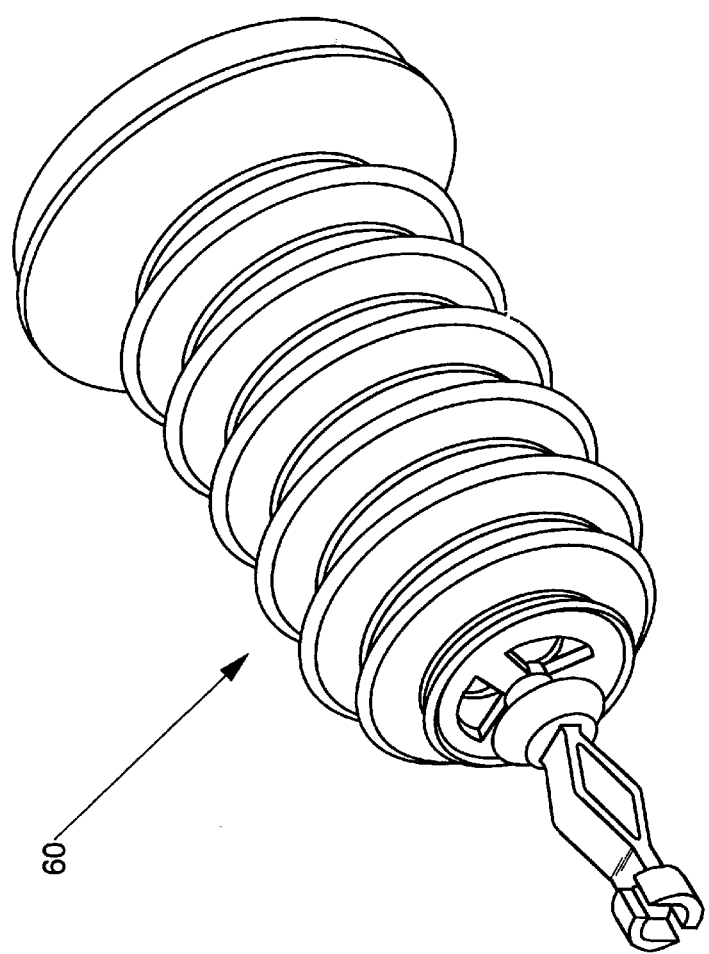
FIG. 1 is an illustration of a sprayer bellows 60 of Example 2.

Both commercially available neat resins and blended resins as described in Example 1 were processed into spring like bellows. The commercial resins and their properties are listed in Table 2-A. The process chosen for making these bellows was injection molding. Two types of bellows were made as illustrated in FIGS. 1 and 2, and both bellows functioned similarly.

TABLE 2-B

Typical Injection Molding Parameters

| Parameter | Setting | Units |
|---|---|---|
| Melt Temperature | 195–225 | °C. |
| Screw RPM | 200–400 | rpm |
| Back pressure | 20–60 | psi |

TABLE 2-B-continued

Typical Injection Molding Parameters

| Parameter | Setting | Units |
|---|---|---|
| Injection Time | 0.5–0.7 | s |
| Hold Pressure | 5000–8000 | psi |
| Hold Time | 2–6 | s |
| Cooling Time | 8–12 | s |
| Mold Temperature | 90 | °C. |

Example 3

Various bellows made by method 2A of Example 2 were subjected to cycle testing (2 Hz, ⅝" stroke, 10,000 strokes) in commercially available Comet Bathroom Cleaner.

The bellows were made from blends of Materials A, C, and D as described in Table 2-A. Results are presented in the following Table 3.

TABLE 3

| Bellows material (percentage ratio) | Results |
|---|---|
| C (100) | Substantial crazing throughout bellows. |
| A/C (70/30) | Some minor crazing in apex. |
| A/C (85/15) | Only one crack with some crazing. |
| C/D (60/40) | Some crazing in inner apex. |
| C/D (95/5) | One of two bellows had a large crack, considered a failure. |

Example 4

The effect on ESCR of a linear low density polyethylene (LLDPE) as a component in an EVA blend was examined. Blend 5 of Table 1 was compared to a ternary blend of Material C and Material D from Table 2-A and a linear low density polyethylene, GA564, sold by Quantum Chemical Company. These three materials were blended as described in Example 1 in ratios of 55:37:8 percent. The ratio of Material C to Material D was equal to that of Blend 5. These materials were molded into bellows as described in Method A of Example 2 and tested for ESCR in the manner described in Example 5. The chemical environment for these tests consisted of cleaning solutions sold commercially as Comet Pine Bathroom Cleaner, Comet Mildew Stain Remover, and Spic and Span Cinch Glass & Surface Cleaner (Cinch) by Procter & Gamble Co. The Comet Pine is an acidic aqueous solution of pH 4, in part, containing dipropylene glycol butyl ether, citric acid and perfume. The Comet Mildew Stain Remover is an aqueous cleaning solution of pH 13, in part containing sodium hypochlorite or bleach. The Cinch is an alkaline aqueous cleaning solution of pH 11, in part, containing isopropanol and perfumes.

The time, in hours, to detect any cracking was recorded in Table 4. A total of three bellows were tested and the average time to failure was reported in this table. The inclusion of LLDPE, GA564, in the ternary blend did not diminish the ESCR relative to blend 5.

TABLE 4

Time To Failure in Modified ESCR Test With Bellows in Cleaners (hrs.)

| Resin | Comet Pine | Comet Mildew | Cinch |
|---|---|---|---|
| Material C | 2 | 1 | 1 |
| Material A | >72 | 64 | 5 |
| Material D | 6 | >72 | >72 |
| Blend 5 | 26 | 55 | 40 |
| UE652/UE634/GA564 (55/37/8%) | 35 | 41 | 42 |

Example 5

Bellows made as described in Example 2 were compressed to 0.7" and placed in Comet Bathroom Cleaner, the first hour at room temperature, 100° F. thereafter. They were then observed for the detection of cracking. Results are presented in Table 5.

TABLE 5

ENVIRONMENTAL STRESS CRACKING RESISTANCE HOURS TO FORMATION OF SMALL CRACKS/HOURS TO FORMATION OF LARGE CRACKS (FAILURE)

| Material\Sample No. | I | II | III | Average |
|---|---|---|---|---|
| UE 634 (100%) | 23 | 23 | 23 | 23 |
| ELVAX 460 | 23 | 26.5 | 8 | 19.2 |
| UE662 (100%) | 1 | 1/2 | 1 | 1/2 |

Example 6

Materials listed in Table 2-A individually or in blends prepared as described in Example 1 were made into bellows as described in Method B of Example 2. The environmental fatigue of these materials was tested as described in Example 3 with the exception that the stroke length was ½". These materials cover a vinyl acetate range from 18 (low) to 28% (high). Blends were prepared by mixing low and high vinyl acetate containing resins. These materials were tested in Pantene Shampoo as sold in Japan. This shampoo was found to be representative of other shampoos in terms of the aggressiveness of the formula as a stress cracking agent. The bellows were tested within a four week period of manufacture. The results are shown in FIG. 3. The ordinate measures the degree of failure on a scale from 1 to 6. A minor amount of cracking (less than 15 small cracks) is indicated by a crack index of 2. The other crack indices are repressed by the following conditions: 1—no cracking; 3—more than 15 small cracks without any deep cracks; 4—deep cracks potentially leading to a hole; 5—one or more isolated holes; 6—coalescence of two or more holes typically forming a slit. The absisca measures the amount of either Material B or Material C in the blend (i.e. the low vinyl acetate resin): the remainder of the blend being composed of Materials D, E, or F (containing a high amount of vinyl acetate) as indicated in the key of FIG. 3. The MFI for each material is also shown in the key of FIG. 3.

The MFI for the five blends presented in FIG. 3 at a 60% composition are shown in Table 6-A. The resistance to cracking increases with either a decrease in MFI or a decrease in MFI ratio.

TABLE 6-A

MFI for Blends in FIG. 3 Having a 60% Composition.

| Materials | Crack Index | MFI (est.) | MFI Hi:Lo Ratio |
|---|---|---|---|
| C:E | 3 | 29 | 0.8 |
| B:E | 3 | 13 | 3.1 |
| C:F | 2.5 | 16 | 0.2 |
| C:D | 2.25 | 12 | 0.1 |
| B:F | 1.75 | 7 | 0.8 |

The approximate compositions (based on the b-spline fit) where the Crack Index equals 2 are listed in Table 6-B. The estimated MFI and MFI Ratio are also listed. From this data, it is clear that EVA compositions with greater percentages of a low vinyl acetate EVA can achieve satisfactory crack resistance if the blends have lower MFI (<20) or lower MFI ratio (<1).

TABLE 6-B

Blends From FIG. 3 Having Crack Index Equal To 2

| Materials | Composition | Estimated MFI | MFI Ratio Hi:Lo |
|---|---|---|---|
| C:E | 30:70 | 26 | 0.8 |
| B:E | 30:70 | 18 | 3.1 |
| C:F | 45:55 | 12 | 0.2 |
| B:F | 60:40 | 7 | 0.8 |

Example 7

The blends prepared in Example 6 were tested for environmental fatigue resistance in a commercial cleaning product, Comet Pine Cleaner made by the Procter & Gamble Co. This product was described in Example 5. The environmental fatigue resistance was graded on a scale from 1 to 6 as described in Example 6. This scale shown on the ordinate and absisca of FIG. 4 are as described in Example 6. The MFI for each material is also shown in the key of FIG. 4.

The MFI for the five blends presented in FIG. 4 at a 60% composition are shown in Table 7-A. The resistance to cracking increases with either a decrease in MFI or a decrease in MFI ratio.

TABLE 7-A

MFI for Blends in FIG. 4 Having a 60% Composition.

| Materials | Crack Index | MFI (est.) | MFI Ratio Hi:Lo |
|---|---|---|---|
| C:E | 3.8 | 29 | 0.8 |
| B:E | 3.0 | 13 | 3.1 |
| C:F | 2.0 | 16 | 0.2 |
| B:F | 2.0 | 7 | 0.8 |
| C:D | 1.0 | 12 | 0.1 |

The approximate compositions (based on the b-spline fit) where the Crack Index equals 2 are listed in Table 7-B. The estimated MFI and MFI Ratio are also listed. From this data, it is clear that compositions with greater percentages of a low vinyl acetate EVA can achieve satisfactory crack resistance if the blends have lower MFI (<20) or lower MFI ratio (<1).

TABLE 7-B

Blends From FIG. 4 Having Crack Index Equal To 2

| Materials | Composition | Estimated MFI | MFI Ratio Hi:Lo |
|---|---|---|---|
| C:E | 20 | 26 | 0.8 |
| B:E | 20 | 18 | 3.1 |
| C:F | 50 | 12 | 0.2 |
| B:F | 60 | 7 | 0.8 |
| C:D | 80 | 12 | 0.1 |

Example 8

The blends prepared in Example 6 were tested for environmental fatigue resistance in a commercial cleaning product, Tide made by the Procter & Gamble Co. This product was, in part, comprised of anionic and nonionic surfactants, enzymes, and fragrances. The environmental fatigue resistance was graded on a scale from 1 to 6 as described in Example 6. This scale shown on the ordinate and absisca of FIG. 5 are as described in Example 6. The MFI for each material is also shown in the key of FIG. 5.

The MFI for the five blends presented in FIG. 5 at a 60% composition are shown in Table 8-A. The resistance to cracking increases with either a decrease in MFI or a decrease in MFI ratio.

TABLE 8-A

MFI for Blends in FIG. 5 Having a 60% Composition.

| Materials | Crack Index | MFI (est.) | MFI Ratio Hi:Lo |
|---|---|---|---|
| C:E | 4.0 | 29 | 0.8 |
| B:E | 3.3 | 13 | 3.1 |
| C:F | 3.0 | 16 | 0.2 |
| B:F | 2.3 | 7 | 0.8 |
| C:D | 2.0 | 12 | 0.1 |

The approximate compositions (based on the b-spline fit) where the Crack Index equals 2 are listed in Table 8-B. The estimated MFI and MFI Ratio is also listed. From this data, it is clear that compositions with greater percentages of a low vinyl acetate EVA can achieve satisfactory crack resistance if the blends have lower MFI (<20) or MFI ratio (<1).

TABLE 8-B

Blends From FIG. 5 Having Crack Index Equal To 2

| Materials | Composition | Estimated MFI | MFI Ratio Hi:Lo |
|---|---|---|---|
| C:E | 0 | 26 | 0.8 |
| B:E | 10 | 18 | 3.1 |
| C:F | 35 | 12 | 0.2 |
| B:F | 50 | 7 | 0.8 |
| C:D | 60 | 12 | 0.1 |

Example 9

Blend 1 and 5 were molded into bellows as described in Method A of Example 2. These materials are 5:95 and 40:60 ratios of Materials D and C, respectively. Material C was also molded into bellows as described in Method A of Example 2. The environmental fatigue resistance of these three bellows was tested as described in Example 3. The results for testing in Comet Bathroom Cleaner are shown in Table 9. Comet Bathroom Cleaner is partially composed of dipropylene glycol butyl ether, citric acid, and perfume. It has a pH of 3.

TABLE 9

Environmental Fatigue
In Comet Bathroom Cleaner

| Resins | Crack Index |
|---|---|
| Blend 1 | 3 |
| Blend 5 | 2 |
| Material C | 4 |

Bellows made from Blend 5 are superior to the other bellows. However, even a 5% addition of Material D improves the environmental fatigue resistance of Material C while a much higher modification, i.e. 40%, is required for the bellows to exhibit significantly improved EFR.

Example 10

Blends 6 and 7 were molded into bellows as described in Method B of Example 2. These materials contain 85% of either Material E or Material F. Materials E and F were also molded into bellows as described in Method B of Example 2. The environmental fatigue resistance of these four bellows was tested as described in Example 3. The results for testing in three cleaning or cleansing products are shown in Table 10.

TABLE 10

Environmental Fatigue of Bellows Made from Materials E and F

| Resin | Pantene | Comet Pine | Tide (drop column) |
|---|---|---|---|
| Blend 6 | 2.5 | 2.0 | 2.0 |
| Blend 7 | 1.5 | 1 | 1.0 |
| Material E | 1.0 | 1 | 2.0 |
| Material F | 1.0 | 1 | 1.3 |

Bellows made from Materials E and F exhibit no cracking or failure after environmental fatigue testing. The addition of 15% UE635-000 (listed in Table 1) to these materials deteriorates the EFR of the blend little to none in comparison to the neat resins. The blend conforming to the preferred embodiment is blend 7. The performance of this blend, that contains 85% of Material F, is equal to that of Material F. The blend not conforming to the preferred embodiment is blend 6. It performs slightly worse than Material E which comprises 85% of Blend 6.

Example 11

Two blends of either 18 or 19% vinyl acetate with similar MFI but different MFI ratios were made into bellows as described in Method B of Example 2 and were tested for environmental fatigue. These blends were Blends 3 and 4 as listed in Table 1. Blend 3 and Blend 4 have estimated MFI ratios of 8 and 7, respectively. Also tested was a commercial resin, Material B, containing 18% vinyl acetate and having a similar MFI to the blends. The results of environmental fatigue are listed in Table 11.

TABLE 11

Environmental Fatigue of Blended Bellows vs. Material B

| Resin | Pantene | Comet Pine | Tide |
|---|---|---|---|
| Blend 3 | 1.0 | 1.0 | 1.5 |
| Blend 4 | 2.0 | 2.5 | 2.0 |
| Material B | 2.8 | 3 | 3.0 |

These three resins have similar % VA and MFI, however, the environmental fatigue of the three resins is distinctly different. The environmental fatigue of the blends is superior to the unblended Material B. Of the blends, Blend 3, which conforms to the preferred embodiment, has superior environmental fatigue.

Example 12

Another comparison of a blended resin to an unblended commercial resin is examined. Blend 2 contains 20% vinyl acetate and has a MFI of 29. This blend is compared to Material C of Table 2-A which has similar properties. These resins were made into bellows as described in Method B of Example 2 and were tested for environmental fatigue as described in Example 3.

TABLE 12

Environmental Fatigue of Blended Bellows vs. Material C

| Resin | Pantene | Comet Pine | Tide |
|---|---|---|---|
| Blend 2 | 3.3 | 4.0 | 3.0 |
| Material C | 3.0 | 4.8 | 4.0 |

The results shown in Table 12 indicate that the Blend 2, which does not conform to the preferred embodiment, performs equally or somewhat superior to the unblended Material C.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A blend composition comprising:
   (a) a first ethylene vinyl acetate copolymer having a first melt flow index and a first weight percent vinyl acetate content in the range of about 20 to about 35 weight percent; and
   (b) a second ethylene vinyl acetate copolymer having a second melt flow index and a second weight percent vinyl acetate content in the range of about 15 to about 22 weight percent,
   wherein the first copolymer and the second copolymer are different.

2. The blend composition of claim 1 wherein the difference between the first weight percent vinyl acetate content and the second weight percent vinyl acetate content is less than about 6 weight percent, and the difference between the first melt flow index and the second melt flow index is greater than about 8.

3. The blend composition of claim 2 wherein the first copolymer comprises in the range of about 25 to about 28 weight percent vinyl acetate, and the second copolymer comprises in the range of about 8 to about 22 weight percent vinyl acetate, wherein the difference between the first melt flow index and the second melt flow index is greater than about 15, and wherein the first copolymer and the second copolymer each comprise greater than about 10 weight percent of the blend composition.

4. The blend composition of claim 2 wherein the first copolymer comprises in the range of about 25 to about 28 weight percent vinyl acetate, and the second copolymer comprises in the range of about 15 to about 19 weight percent ester monomer, wherein the difference between the first melt flow index and the second melt flow index is greater than about 20, and wherein the first copolymer and the second copolymer each comprise in the range of about 30 to about 70 weight percent of the blend composition.

5. The blend composition of claim 1 wherein the difference between the first weight percent vinyl acetate content and the second weight percent vinyl acetate content is at least 6, and the ratio of the melt flow index of the copolymer having a higher ester monomer content to the melt flow index of the other copolymer, is about 2 or less.

6. The blend composition of claim 1 wherein the first copolymer comprises in the range of about 25 to about 28 weight percent vinyl acetate, and the second copolymer comprises in the range of about 15 to about 19 weight percent vinyl acetate, wherein the difference between the first weight percent vinyl acetate content and the second weight percent vinyl acetate content is at least 8, and the ratio of the melt flow index of the copolymer having a higher ester monomer content to the melt flow index of the other copolymer is about 1.5 or less, and wherein the first copolymer and the second copolymer each comprise greater than about 10 weight percent of the blend composition.

7. The blend composition of claim 1 wherein the first copolymer comprises in the range of about 25 to about 28 weight percent ester monomer, and the second copolymer comprises in the range of about 15 to about 19 weight percent ester monomer, wherein the difference between the first weight percent vinyl acetate content and the second weight percent vinyl acetate content is at least 10 weight percent, and the ratio of the melt flow index of the copolymer having a higher vinyl acetate content to the melt flow index of the other copolymer is less than about 1, and wherein the first copolymer and the second copolymer each comprise in the range of about 20 to about 80 weight percent of the blend composition.

8. A method of making a blend composition, the method comprising contacting together:
(a) a first copolymer of ethylene vinyl acetate having a first melt flow index and a first weight percent vinyl acetate content in the range of about 20 to about 35 weight percent;
(b) a second copolymer of ethylene vinyl acetate having a second melt flow index and a second weight percent vinyl acetate content in the range of about 15 to about 22 weight percent, wherein the first copolymer and the second copolymer are different.

9. The method of claim 8 wherein the difference between the first weight percent vinyl acetate content and the second weight percent vinyl acetate content are less than about 6 weight percent, and the difference between the first melt flow index and the second melt flow index is greater than about 8.

10. The method of claim 8 wherein the first copolymer comprises in the range of about 25 to about 28 weight percent vinyl acetate, and the second copolymer comprises in the range of about 15 to about 19 weight percent vinyl acetate, wherein the difference between the first melt flow index and the second melt flow index is greater than about 20, and wherein the first copolymer and the second copolymer each comprise in the range of about 20 to about 80 weight percent of the blend composition.

11. The method of claim 8 wherein the difference between the first weight percent vinyl acetate content and the second weight percent vinyl acetate content is at least 6, and the ratio of the melt flow index of the copolymer having a higher vinyl acetate content to the melt flow index of the other copolymer, is about 2 or less.

12. The method of claim 8 wherein the first copolymer comprises in the range of about 25 to about 28 weight percent vinyl acetate, and the second copolymer comprises in the range of about 15 to about 19 weight percent vinyl acetate, wherein the difference between the first weight percent vinyl acetate content and the second weight percent vinyl acetate content is at least 9 weight percent, and the ratio of the melt flow index of the copolymer having a higher vinyl acetate content to the melt flow index of the other copolymer is less than about 1, and wherein the first copolymer and the second copolymer each comprise in the range of about 20 to about 80 weight percent of the blend composition.

13. A method of making a blend, the method comprising contacting together:
(a) a first copolymer of ethylene vinyl acetate having a first melt flow index and a first weight percent vinyl acetate content in the range of about 20 to about 35 weight percent;
(b) a second copolymer of ethylene vinyl acetate having a second melt flow index and a second weight percent vinyl acetate content in the range of about 15 to about 22 weight percent,
wherein the first copolymer and the second copolymer are different.

14. The method of claim 13 wherein the difference between the first weight percent vinyl acetate content and the second weight percent vinyl acetate content are less than about 6 weight percent, and the difference between the first melt flow index and the second melt flow index is greater than about 8.

15. The method of claim 13 wherein the first copolymer comprises in the range of about 25 to about 28 weight percent vinyl acetate, and the second copolymer comprises in the range of about 15 to about 19 weight percent vinyl acetate, wherein the difference between the first weight percent vinyl acetate content and the second weight percent vinyl acetate content are less than about 3 weight percent, wherein the difference between the first melt flow index and the second melt flow index is greater than about 20, and wherein the first copolymer and the second copolymer each comprise in the range of about 30 to about 70 weight percent of the blend composition.

16. The method of claim 13 wherein the difference between the first weight percent vinyl acetate content and the second weight percent vinyl acetate content is at least 6, and the ratio of the melt flow index of the copolymer having a higher vinyl acetate content.

17. The method of claim 13 wherein the first copolymer comprises in the range of about 25 to about 28 weight percent vinyl acetate, and the second copolymer comprises in the range of about 15 to about 19 weight percent vinyl acetate, wherein the difference between the first weight percent vinyl acetate content and the second weight percent vinyl acetate content is at least 9 weight percent, and the ratio of the melt flow index of the copolymer having a higher vinyl acetate content to the melt flow index of the other copolymer is less than about 1, and wherein the first copolymer and the second copolymer each comprise in the range of about 30 to about 70 weight percent of the blend composition.

* * * * *